(12) United States Patent
Anderson et al.

(10) Patent No.: US 11,625,280 B2
(45) Date of Patent: Apr. 11, 2023

(54) CLOUD-NATIVE PROXY GATEWAY TO CLOUD RESOURCES

(71) Applicant: BMC Software, Inc., Houston, TX (US)

(72) Inventors: Eric Michael Anderson, Friendswood, TX (US); Brendan Farrell, Austin, TX (US); Saifuddin Fazlehusen Rangwala, Pune (IN); Ajoy Kumar, Santa Clara, CA (US)

(73) Assignee: BMC Software, Inc., Houston, TX (US)

( * ) Notice: Subject to any disclaimer, the term of this patent is extended or adjusted under 35 U.S.C. 154(b) by 461 days.

(21) Appl. No.: 16/836,847

(22) Filed: Mar. 31, 2020

(65) Prior Publication Data

US 2021/0303366 A1    Sep. 30, 2021

(51) Int. Cl.
*G06F 9/455* (2018.01)
*G06F 9/50* (2006.01)
*G06F 9/54* (2006.01)
*H04L 12/46* (2006.01)
*H04L 12/66* (2006.01)
(Continued)

(52) U.S. Cl.
CPC ........ *G06F 9/5072* (2013.01); *G06F 9/45558* (2013.01); *G06F 9/547* (2013.01); *H04L 12/4633* (2013.01); *H04L 12/66* (2013.01); *H04L 63/029* (2013.01); *H04L 63/0272* (2013.01); *G06F 2009/45595* (2013.01); *H04L 67/10* (2013.01)

(58) Field of Classification Search
CPC .... G06F 9/5072; G06F 9/45558; G06F 9/547; G06F 2009/45595; H04L 12/4633; H04L 12/66; H04L 67/56; H04L 63/0272; H04L 67/10; H04L 63/029
See application file for complete search history.

(56) References Cited

U.S. PATENT DOCUMENTS

2008/0240020 A1* 10/2008 Ye ........................... H04L 45/52
370/328
2019/0207784 A1* 7/2019 Aizikovich ......... G06F 9/45558
(Continued)

OTHER PUBLICATIONS

Benomar et al., "Extending Openstack for Cloud-based networking at the Edge", 2018, IEEE, pp. 162-169. (Year: 2018).*
(Continued)

*Primary Examiner* — Kenneth Tang
(74) *Attorney, Agent, or Firm* — Brake Hughes Bellermann LLP

(57) ABSTRACT

A cloud-native proxy gateway is reachable from a central server and from an isolated cloud VM. A method allows legacy (non-cloud native) solutions to establish a secure connection to the isolated cloud VM, even when incoming port flows are not enabled. The method involves transforming a TCP/IP network connection request into a cloud API call, ignoring IP addresses, and instead using a unique cloud resource identifier as the primary network routing methodology. In response to a communication connection request by the central server, the isolated VM establishes a reverse tunnel to the cloud-native proxy gateway. Communication flow initiated by the central server proceeds through the reverse tunnel to the isolated VM, avoiding an issue of duplicate IP addresses in the cloud.

30 Claims, 5 Drawing Sheets

(51) Int. Cl.
*H04L 9/40* (2022.01)
*H04L 67/10* (2022.01)

(56) References Cited

U.S. PATENT DOCUMENTS

2019/0312841 A1* 10/2019 Moses .................... H04L 67/56
2020/0244720 A1* 7/2020 Balthaser ............ H04L 12/4633
2020/0244749 A1* 7/2020 Balthaser ............ G06F 9/45558

OTHER PUBLICATIONS

Lampesberger, Harald, "Technologies for Web and cloud service interaction: a survey", Mar. 9, 2015, Service Oriented Computing and Applications manuscript, pp. 1-41. (Year: 2015).*
Merlino et al., "Enabling mechanisms for Cloud-based network virtualization in IoT", 2015, IEEE, pp. 1-6. (Year: 2015).*
Malevanniy, Daniil et al., "Controlled Remote Usage of Private Shared Resources via Docker and NOVNC", Advances in Databases and Information Systems; [Lecture Notes in Computer Science; Lect. Notes Computer], Springer International Publishing, CHAM; Jun. 29, 2019, pp. 782-791.
International Search Report and Written Opinion issued in International Application No. PCT/US2021/070328, dated Jun. 1, 2021, 15 pages.

* cited by examiner

↓ (continued)

Determining whether a reverse tunnel exists for a cloud VM having the unique resource ID 307

Sending incoming communication flow from the central server to the target cloud VM through the reverse tunnel by adjusting the port (e.g., port 80) designated in the incoming communication flow (from the central server) to the local port assigned to the reverse tunnel 308

For outgoing communication flow from the target cloud VM, adjusting the local port back to, and making a connection to localhost on, the originally designated port 309

When the reverse tunnel does not exist, establishing a reverse tunnel (e.g., an SSH tunnel) (outgoing connection) from the target cloud VM back to the cloud-native proxy gateway 310

Looking up calling information for the target cloud VM in a cloud resources inventory 311

Reserving a random local port for the target cloud VM by its its resource name (e.g., resource ID) 312

Making an API call to the cloud provider's native cloud API to establish a shell connection to the target cloud VM 313

Issuing a single command to a local agent (e.g., an SSM agent) in the cloud VM to establish a reverse tunnel from the target cloud VM back to the cloud-native proxy gateway 314

Return to step 308   315

CLOUD-NATIVE PROXY GATEWAY TO CLOUD RESOURCES

This disclosure relates to managing groups of virtual machines (VMs) on cloud computing platforms.

BACKGROUND

A cloud is a term used to describe a group of multiple servers working together on a network to perform complex tasks by shared or joint use of technology and applications for customers. Several commercial cloud service providers (e.g., Amazon Web Services (AWS), Alibaba Cloud, Microsoft Azure, Google Cloud Platform, Oracle Cloud Infrastructure, VMware Cloud Management Platform, etc.) now offer cloud computing platforms to support services that include web hosting and information processing, resource sharing, application and technology sharing. Each cloud computing platform can include several computing resources such as servers (e.g., VMs) that can be shared between customer accounts. A private cloud virtual network (PCVN) can be an on-demand configurable pool of shared computing resources allocated within a cloud environment on a private network to a customer account. Each customer account may have a respective PCVN dedicated to the account. Each PCVN may provide a certain level of logical isolation from other different private networks. Each PCVN may, for example, have its own internal system of Internet Protocol (IP) addresses for the computing resources.

It is noted that different commercial providers refer to their PCVNs by different names. For example, AWS and Google refer to a PCVN as a Virtual Private Cloud (VPC); Microsoft Azure refers to a PCVN as an Azure Virtual Network (Vnet); Oracle refers to a PCVN as a virtual cloud network (VCN); etc.

SUMMARY

A method allows legacy (non-cloud native) solutions to establish a secure connection to an isolated VM in a private network (e.g., a PCVN) even when incoming communication port flows to the isolated VM are not enabled. The isolated VM may have Internet Protocol (IP) addresses that are duplicated with other VMs and networks.

With no incoming port flows enabled, a method can establish a Transmission Control Protocol/Internet Protocol (TCP/IP)-like connection between two network endpoints (i.e., a central server and the isolated VM) by using unique resource names or identifiers (e.g., resource ID) and dynamic tunneling, instead of traditional IP address or hostname network routing. A resource ID may, for example, include a string of alphanumeric characters (e.g., dQw4w9WgXcQ), but is not formatted as an IP address. The method involves transforming a traditional TCP/IP network connection request into a cloud application programing interface (API) call, ignoring IP addresses, and instead using a cloud resource ID) as a basis for network routing.

In an example implementation, a method involves creating or interposing a cloud-native proxy gateway (e.g., a transit gateway) that is reachable by two endpoints—a central server and an isolated VM. Both endpoints can only initiate outgoing communication flows. In response to a communication connection request by a central server, the isolated VM establishes a reverse tunnel to a cloud-native proxy gateway. The communication flow (initiated by the central server) proceeds through a reverse tunnel to the isolated VM, avoiding issues of duplicate IP addresses.

A method uses a cloud API access (e.g., such as those provided by cloud providers) to establish a shell on an isolated VM. Once the shell is established, information (e.g., gateway address, port, private key, etc.) is sent to the isolated VM to establish a reverse tunnel (outgoing only) to a cloud-native proxy gateway. The reverse tunnel provides a route for a more traditional TCP/IP communication flow. The cloud-native proxy gateway can assign a random port to the reverse tunnel and start directing all traffic destined for the isolated VM (identified by its resource ID) to the assigned port and hence through the reverse tunnel.

The details of one or more implementations are set forth in the accompanying drawings and the description below. Other features will be apparent from the description and drawings, and from the claims.

BRIEF DESCRIPTION OF THE DRAWINGS

Throughout the figures, unless otherwise stated, the same reference numerals and characters are used to denote like features, elements, components, or portions of the illustrated embodiments.

DETAILED DESCRIPTION

Figure 1A:
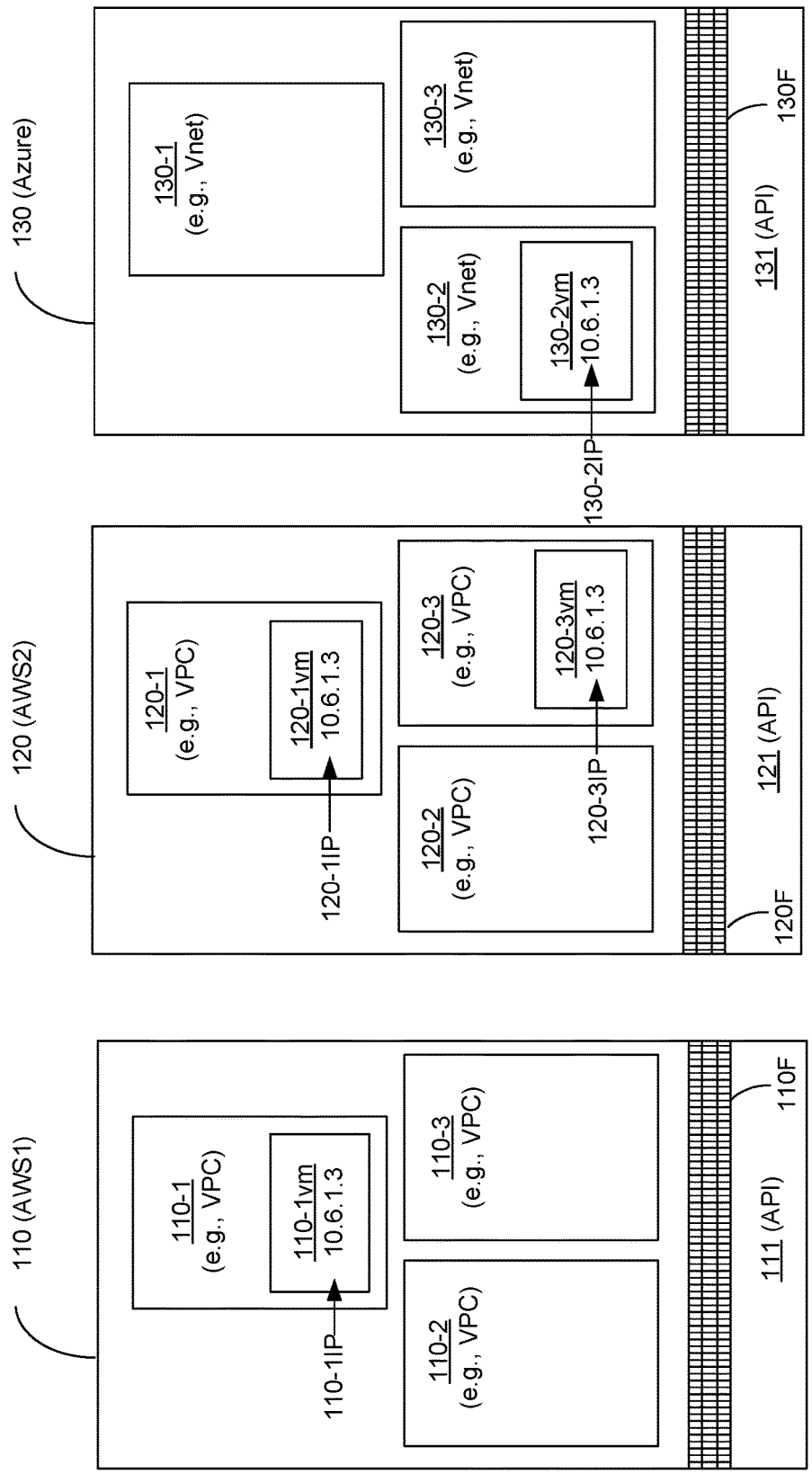
FIG. 1A is a schematic illustration of an example arrangement of clouds provided by various cloud providers.

A traditional practice for managing computing resources (e.g., servers) on a fixed network involves deploying agents on the computing resources to perform operations work such as resource utilization scanning, vulnerability scanning, patch deployment, software deployment, etc. A central service (e.g., a central server) connects and communicates with the agents in the network using their IP addresses for communications under the TCP/IP. The traditional practice may be satisfactory in centralized scenarios (e.g., datacenters) in which the underlying network has mostly fixed connections that stay fairly unchanged, and has carefully managed IP address ranges. Instances of IP address conflicts (i.e., duplicate IP addresses) in the network are dealt with, for example, by establishing Network Address Translation (NAT) rules in network routers to resolve IP address conflicts in forwarding or receiving TCP/IP communications.

The traditional practice of managing computing resources on a fixed network does not work well in the cloud. For example, under a de-centralized model of cloud deployment, each customer can have hundreds or thousands of cloud accounts. The multiplicity of cloud accounts can give a customer greater control on who manages what aspect of information technology (IT) services and what kind of access is granted in each cloud account. However, each cloud account can have tens or hundreds of PCVNs that are isolated from each other. Each PCVN can internally have its own set of private IP addresses that may include many duplicates across the PCVNs. At least because there may be thousands of PCVNs with many new ones dynamically added and removed every day from the cloud, it is not possible or practical to establish NAT rules for network routers in a cloud to resolve, for example, the duplicate IP address conflicts between different PCVNs.

Systems and methods for establishing communications connectivity from a central server to computing resources (e.g., VMs) in a cloud are described herein. A cloud-native solution may be a collection of small, independent, and loosely coupled services (e.g., containers) specifically for a cloud environment, along with data and application services (cloud-native solutions). The systems and methods provide a cloud-native solution for management of VMs by establishing proper connectivity to the VMs from a central server. The cloud-native solution can securely connect a central server to VMs even when the central server sits on a disconnected network and the VMs are on different PCVNs (in other words, on networks that are disconnected from each other).

Instead of utilizing traditional IP address or hostname network routing, the cloud-native solutions described herein may use resource IDs and dynamic tunneling network routing to establish TCP/IP connections between two network endpoints in the cloud. In example implementations, cloud-native solutions may enable legacy (non-cloud-native) solutions to initiate a secure connection to an isolated VM even when no incoming TCP/IP port flows to the VM are allowed (e.g., in duplicate IP addresses environment).

A cloud-native solution may access cloud APIs to establish connectivity to agents embedded in the VMs. The agents may include an agent (e.g., like the Systems Manager Agent (SSM Agent) provided by AWS) that may be able to process a request received via cloud APIs to configure a VM as specified in the request. The cloud-native solutions may utilize resource identifiers, availability zones and regions of corresponding computer resources, and PCVNs for directing communications to, and from, agents embedded in the VMs.

In an example implementation, a cloud-native solution may transform a traditional TCP/IP network connection request (e.g., from a central server) into a cloud API call. The cloud-native solution may use cloud resource identifiers as the primary network routing methodology, instead of using IP addresses to direct the API calls.

A cloud-native solution interposes a cloud-native proxy gateway (i.e., a transit gateway server) between, and reachable by both, a central server and a VM (e.g., an isolated VM) that are on disconnected networks. Both the central server and the isolated VM can initiate only outgoing flows. The isolated VM can establish a reverse tunnel (e.g., a secure shell (SSH) tunnel) to the cloud-native proxy gateway. An outgoing communication flow initiated from a central server and directed to a target VM can proceed through a reverse tunnel to reach the target VM, avoiding issues of duplicate IP addresses on the networks under TCP/IP.

All major cloud providers (e.g., Amazon Web Services (AWS), Alibaba Cloud, Microsoft Azure, Google Cloud Platform, VMware, etc.) may provide API access to a shell on a VM in a cloud using a combination of identifying parameters (e.g., cloud resource ID, region, zone, country, etc.) and a proper API key access. A cloud-native solution may establish a shell for the VM, and send information (e.g., such as a cloud-native proxy gateway address, port, and private key) to the VM for establishing a reverse tunnel to a cloud-native proxy gateway for outgoing VM communications. The cloud-native proxy gateway can assign a random port to the reverse tunnel and direct all traffic destined for the VM to the assigned port for transit through the reverse tunnel.

For purposes of illustration, FIG. 1A schematically shows an example arrangement (10) of three clouds (e.g., clouds 110, 120, and 130) that may be provided by various cloud providers (e.g., AWS, Microsoft Azure, etc.). As shown in the figure, cloud 110 may, for example, be a first cloud platform (AWS1) provided by AWS. Cloud 120 may, for example, be a second cloud platform (AWS2) provided by AWS. Cloud 130 may, for example, be a third cloud platform (Azure) provided by Microsoft Azure. Each of the clouds 110, 120, and 130 may include multiple PCVNs that are dedicated to individual customers. For example, as shown in FIG. 1A, cloud 110 may include VPCs labelled as 110-1, 110-2, 110-3; cloud 120 may include VPCs labelled as 120-1, 120-2, 120-3; and cloud 130 may include Vnets labelled as 130-1, 130-2, 130-3. Each of the clouds 110, 120, and 130 may include a cloud API (e.g., API 111, API 121, API 131, respectively) through which applications can access computer resources, features, and data in the respective clouds across firewalls (e.g., firewalls 110F, 120F and 130F, respectively).

Each of the PCVNs in clouds 110, 120, and 130 may host one or more VMs (servers). For visual clarity, only a few of the one or more VMs are shown in FIG. 1A (e.g., VM 110-1$vm$ in PCVN 110-1, VM 120-1$vm$ in VPC 120-1, VM 120-3$vm$ in VPC 120-3, VM 130-2$vm$ in Vnet 130-2, etc.). Each cloud resource (e.g., a VM) may have a unique name (e.g., resource ID) (not shown)) provided, for example, by the cloud service provider. However, each PCVN may use a private IP address space for addressing the VMs within the PCVN. For example, VM 110-1$vm$ may have an IP address 110-1IP, VM 120-1$vm$ may have an IP address 120-1IP, VM 120-3$vm$ may have an IP address 120-3IP, VM 130-2$vm$ may have an IP address 130-2IP, etc. The PCVNs (e.g., PCVN 110-1, PCVN 110-2, PCVN 110-3, PCVN 120-1, etc.) may use the same IP address ranges for the VMs in the PCVN. As a result, multiple VMs in the different PCVNs can have a same IP address. For example, as shown in FIG. 1A, IP address 110-1IP, IP address 120-1IP, IP address 120-3IP, and IP address 130-2IP may be the same IP address: 10.6.1.3.

As previously noted, for communications between networks in duplicate IP address scenarios (e.g., in arrangement (10) of clouds), the networks or hosts must be individually renumbered, often a time-consuming task, or a network address translator (NAT) must be placed between the networks to translate or masquerade the duplicate IP addresses. The cloud-native solution described herein, avoids renumbering of the networks and hosts, and avoids use of NAT in duplicate IP address scenarios by providing reverse tunnels from individual VMs for communications between networks.

Figure 1B:
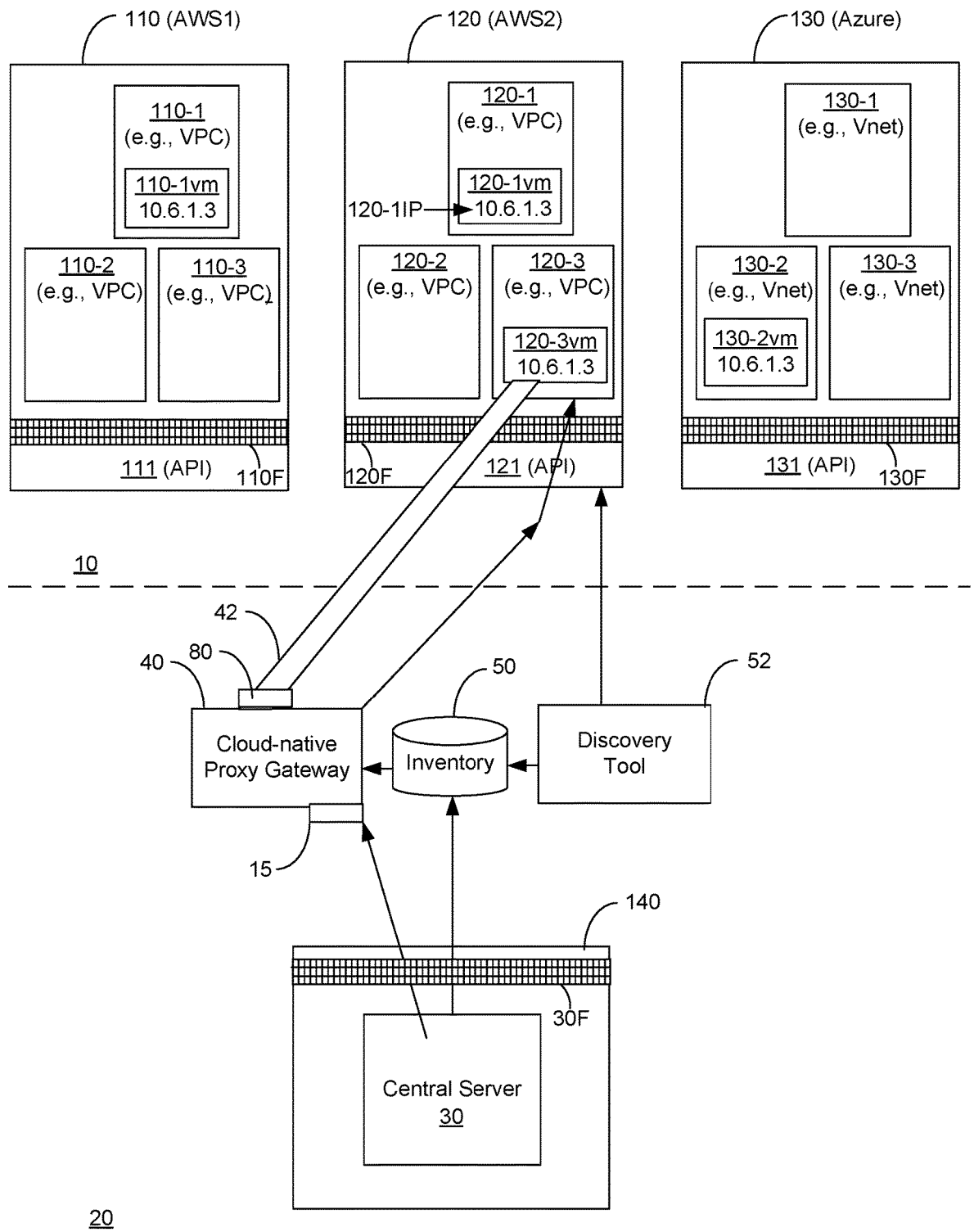
FIG. 1B is a schematic illustration of an example system for implementing a cloud-native solution for communication with VMs hosted on private networks (e.g., PCVNs) in a cloud arrangement (e.g., the VMs in cloud arrangement of FIG. 1A).

FIG. 1B shows an example system (20) for implementing a cloud-native solution for communication with VMs hosted on private networks in a cloud (e.g., the VMs in cloud arrangement 10), in accordance with the principles of the disclosure herein.

System 20 may include a proxy server (e.g., cloud-native proxy gateway 40) coupled to a central server 30. Both cloud-native proxy gateway 40 and central server 30 may be physical machines or virtual machines that are hosted on cloud or local networks. For example, central server 30 may be hosted on a cloud or local network 140.

System 20 further includes a configuration management database (CMDB) or other data store (e.g., inventory 50) that includes information (e.g., resource IDs) on computing resources (e.g., VMs) in a cloud. The information may include key elements that may be required to properly identify a cloud API and to gain access to a specific VM in a cloud. In example implementations, key elements may include, for example, a relationship between resource ID, cloud account, cloud account region, and other properties of a specific VM. The key elements may, for example, include a relationship of the ID of the specific VM itself, the IDs of any parent resources, and an API service name.

Information on computing resources may be collected and updated using a network discovery tool (e.g., discovery tool 52). In example implementations, discovery tool 52 may be a commercially available network discovery tool (e.g., BMC Helix® Discovery, etc.) that can access cloud APIs to identify computer resources (e.g., VMs) in a cloud. Each cloud resource may be identified by a resource ID. Discovery tool 52 may scan a cloud, for example, on a regular basis, and download any new information on existing VMs in the cloud, and information on any new VMs found in the cloud. The downloaded information may be stored in a cloud resources inventory (e.g., inventory 50).

Central server 30 may have a resources management workload that should be connected or delivered to an isolated network (e.g., PCVN 120-3). In an example implementation, the resources management workload may be a server management solution that, for example, needs to issue a patch to the cloud VMs due to a security vulnerability. Central server 30 may be aware of the presence of cloud VMs because it can query inventory 50 on a regular basis for information on the cloud VMs. Central server 30 may be configured to connect directly to cloud VMs. Central server 30 may be configured not to allow incoming port flows past a firewall (e.g., firewall 30F).

Cloud-native proxy gateway 40 may be configured to connect to a shell of a VM (e.g., VM 120-3vm) via a cloud API (e.g., API 121) to access software (e.g., an agent) that is provided by a cloud service provider. For example, cloud service provider AWS includes a default installation of a Systems Manager Agent (SSM agent) on all of its VMs in the cloud (e.g., cloud 110 (AWS1), cloud 120 (AWS2)). An agent can be invoked through a specific API call. With proper API credentials and calling information (resource name, region, account, etc.) for a VM (e.g., VM 120-3vm), cloud-native proxy gateway 40 can establish a connection to the shell of the VM and execute commands on the operating system (OS) of the VM.

Cloud-native proxy gateway 40 may be configured to act as a proxy server for central server 30, and include logic to generate a reverse SSH tunnel (e.g., reverse tunnel 42) from a cloud VM (e.g., VM 120-3vm) back to itself (cloud-native proxy gateway 40). Reverse tunnel 42 initiated from a VM (e.g., VM 120-3vm) to cloud-native proxy gateway 40 can provide a channel for outgoing communication flow from the VM. In example implementations, cloud-native proxy gateway 40 may have any number (e.g., thousands) of such reverse tunnels from individual VMs active at any given time.

Cloud-native proxy gateway 40 may be configured to map a request (e.g., from central server 30) for a connection to a cloud VM to a specific port. The cloud VM may be identified by its unique resource ID specified in the request. In example implementations, cloud-native proxy gateway 40 may manage an in-memory hash table to map a resource name and a local port (e.g., port 15) designated in the request (from central server 30) to a specific port (e.g., port 80). The specific port may be bonded to a reverse tunnel (e.g., reverse tunnel 42) initiated from a cloud VM. This may allow central server 30 to establish a connection to what it considers to be a hostname of a cloud VM, bypassing traditional TCP/IP networking flows based on IP addresses, and instead pushing a connection via gateway 40 through a reverse tunnel.

After cloud-native proxy gateway 40 establishes a connection to a VM (e.g., VM 120-3vm), it may issue a command to create, on demand, a reverse tunnel (e.g., reverse tunnel 42, outgoing from the VM to cloud-native proxy gateway 40). Any communication flow that exits the reverse tunnel may be limited to only local host connections (i.e., the cloud-native proxy gateway). This ensures that the reverse tunnel can only be used at the specified port to connect to the VM. The reverse tunnel is established on-demand and is terminated after the central server 30 is finished with its communication.

Figure 2:
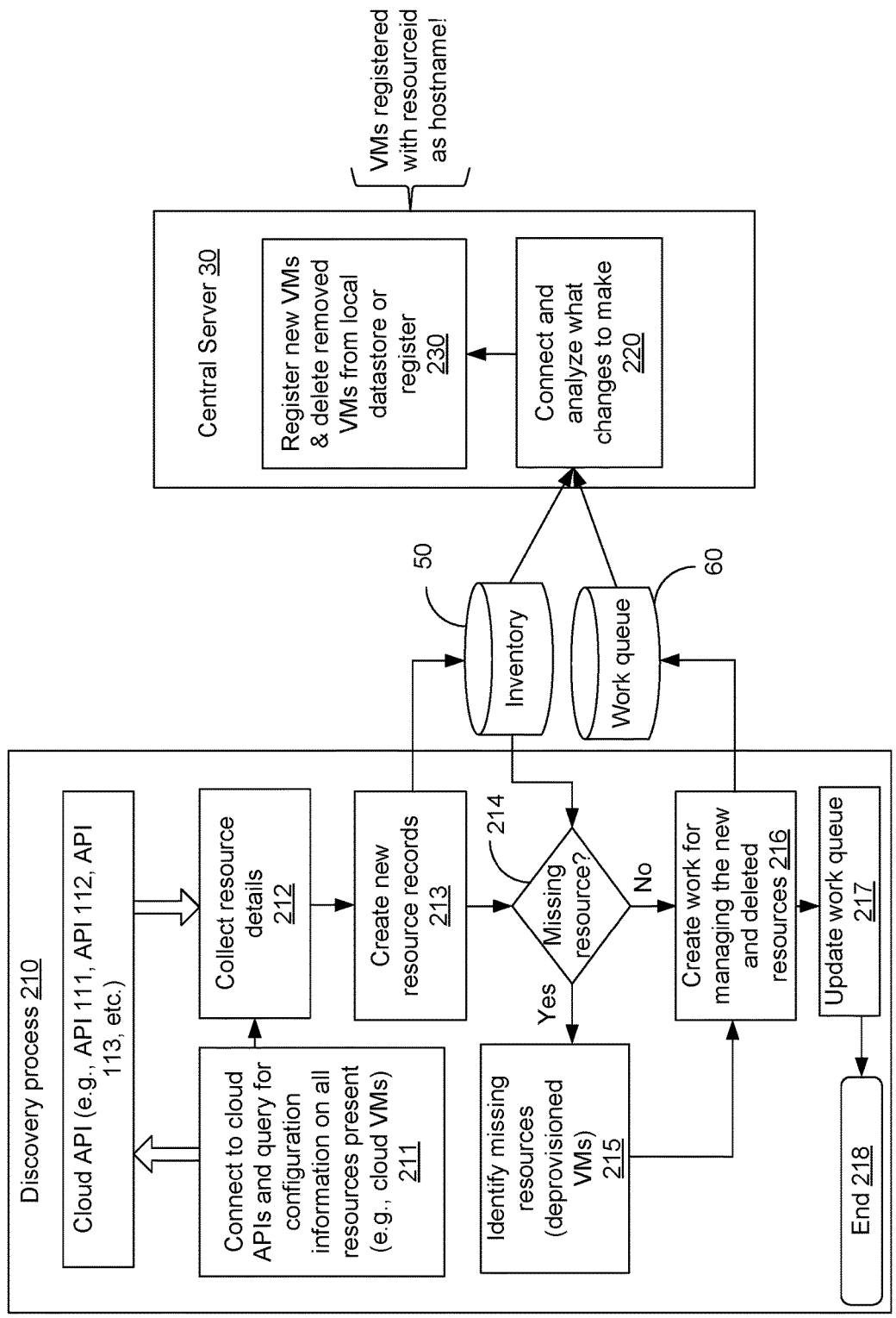
FIG. 2 schematically illustrates an example method for managing communications with VMs in the cloud in conjunction with a discovery process for identifying a current state of the VMs (e.g., the VMs in cloud arrangement of FIG. 1A).

FIG. 2 schematically illustrates an example method 200 for managing communications with VMs in a cloud in conjunction with a discovery process 210 for identifying a current state of VMs, in accordance with the principles of the disclosure herein. Method 200 may be implemented, for example, in system 20 (FIG. 1B) to manage the VMs that are shown, for example, in arrangement 10 (FIG. 1A).

Method 200 involves discovering and registering cloud resources by their resource IDs. Method 200 uses resource IDs for communications with VMs that have no allowable incoming port flows. Method 200 avoids the problem of duplicate IP addresses by not using IP addresses for communications with VMs.

In method 200, discovery process 210 may involve connecting to cloud APIs (e.g., API 111, API 121, API 131, FIG. 1B.) and querying for configuration information on all resources present (e.g., cloud VMs) in a cloud (211), collecting resource details (212), and creating new resource records (213).

Querying for the configuration information on all resources present in a cloud 211 may not be limited to information on new VMs in the cloud, but may also include information on VMs that have been de-provisioned or removed from service. The queried information on VMs may include pieces of information (e.g., resource name (resource ID), availability zone and region, etc.) that may be used to identify individual VMs.

Collecting resource details 212 may include downloading and storing new resource records (e.g., a list of VMs) in a cloud resources database (e.g., inventory 50). New resource records may supplement or complete existing information about the cloud VMs listed in the cloud resources inventory 50.

Collecting resource details 212 may include creating representations of new cloud VMs (and updating existing representations of new cloud VMs). In example implementations, resource IDs of cloud VMs may be the most relevant information to uniquely identify a specific cloud VM across multiple cloud accounts and PCVNs (i.e., VPCs, vNets, etc.).

Discovery process 210 further includes determining whether there are missing resources in a current state of a cloud (214). For example, inventory 50 may list one or more resources that were present in a cloud at an earlier time, but have been removed or de-provisioned in the current state of the cloud. Discovery process 210 may include identifying missing resources (de-provisioned VMs) (215). For this purpose, discovery process 210 may compare a presently downloaded list of VMs in a cloud with an existing list of previously present VMs in inventory 50. If there are previously present VMs that are missing in the presently downloaded list of VMs, discovery process 210 may collect the resource information, and then delete the missing VMs from inventory 50 (or mark missing VMs as being deprovisioned, if data retention is desired).

Before ending at 218, discovery process 210 may further include creating work for managing the new and deleted resources (e.g., VMs) (216), and updating a work queue (217) (e.g., work queue 60) for managing VMs in a cloud. Creating work for managing new and deleted resources 216 may include creating work for many different systems, all of which may need an ability to connect to VMs in a cloud to perform the work.

Work queue 60 may be made accessible to any client service or server (e.g. central server 30) that needs to communicate with cloud VMs present in disconnected cloud networks. In example implementations, client services and servers (e.g., central server 30) may be legacy tools.

In method 200 for discovering and registering cloud resources by their resource IDs, a client service or server (e.g., central server 30) may connect to inventory 50 and work queue 60, for example, to analyze what work or changes need to be made to cloud VMs (220). Client service or server (e.g., central server 30) may poll work queue 60 on a regular basis to find work assigned to it. When it finds work, the work may indicate whether the work is related to the newly discovered VMs or to old deprovisioned or removed VMs.

Method 200 may further include registering new VMs in, and deleting removed VMs from, a local datastore or register of central server 30 (230). Central server 30 may register a new VM using a resource name including the resource ID of the new VM. The resource name may be represented using plain strings that can be handled (e.g., by cloud APIs) much like normal file or network paths. The resource name may be registered as a string, for example, in a cloud network path or domain (e.g., a cloudvm.com domain). For example, a VM with a resource ID=i_aabd224d may be registered under the name: i_aabd224d.cloudvm.com.

Central server 30 may route communications addressed by resource ID (e.g., xxxxxx.cloudvm.com) to a proxy server (e.g., cloud-native proxy gateway 40, FIG. 1B) instead of routing communications to VMs over local networks.

Figure 3:
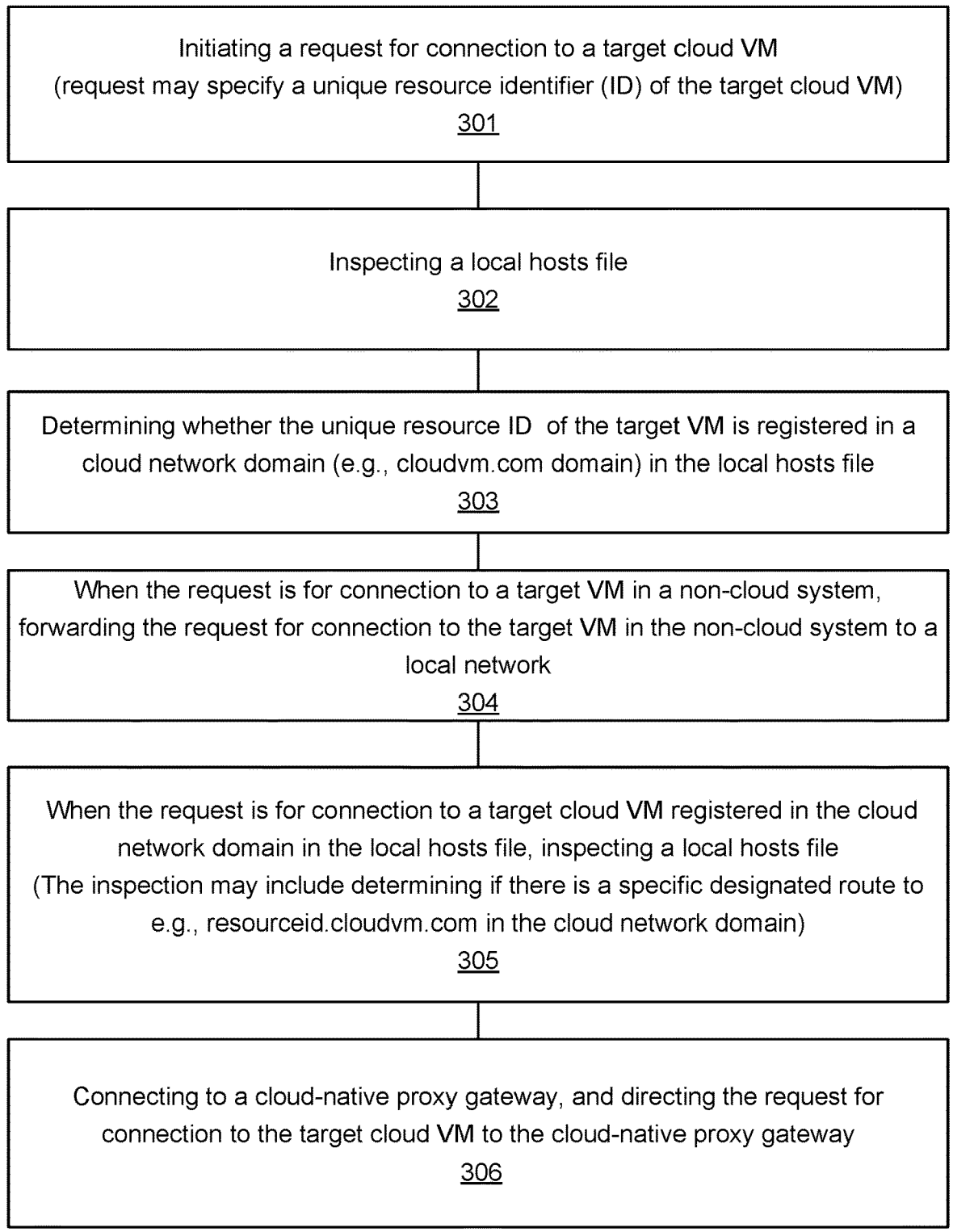
FIG. 3 illustrates an example method for establishing connections to cloud VMs.

FIG. 3 schematically illustrates an example method 300 for establishing connections to cloud VMs, in accordance with the principles of the disclosure herein. Method 300 may be implemented, for example, in system 20 (FIG. 1B) to establish connections to VMs that are shown, for example, in arrangement 10 (FIG. 1A). In example implementations, connections are established based on resource IDs of cloud VMs.

Method 300 may be initiated by a system or service (e.g., central server 30) to manage a target VM (e.g., VM 120-3vm, FIG. 1A). Central server 30 and a target VM may be located on separate disconnected local networks (e.g., cloud 110 (AWS1), cloud 120 (AWS2), and cloud 130 (Azure), FIG. 1B) in a cloud. A target VM may be registered in a datastore (e.g., in inventory 50). A target VM may be registered with resource ID as its name, for example, in a cloud network domain (e.g., a cloudvm.com domain). Method 300 may be used to establish a connection to a port, which may be used as a listening port by VM 120-3vm (e.g., for TCP/IP flows).

Method 300 may begin with initiating a request for connection to a target cloud VM (301). The connection request may be initiated, for example, at central server 30. The connection request may specify the target cloud VM by its resource ID or other identifier. In response to a connection request, method 300 may include inspecting a local hosts file (302), and determining whether the resource ID of the target VM is registered in a cloud network domain (e.g., the cloudvm.com domain) in the local hosts file (303).

When the request for connection is to a target VM in a non-cloud system, no resource ID entry may exist for the target VM in a cloud network domain. The target VM in the non-cloud system may be identified by an IP address or a hostname that is translated by a Domain Naming System (DNS) resolver into an IP address. Method 300 may include forwarding the request for connection to the target VM in the non-cloud system to a local network (304), which is typical TCP/IP behavior.

When the request for connection is to a target cloud VM registered in the cloud network domain (e.g., as resource-id.cloudvm.com) in the local hosts file, method 300 may include inspecting a local hosts file (305). The inspection may include determining if there is a specific designated route to for example, resource-id.cloudvm.com in the cloud network domain.

In example implementations, the specific designated route may include directing *.cloudvm.com to a cloud-native proxy gateway (e.g., cloud-native proxy gateway 40, FIG. 1B). Method 300 may include connecting to a cloud-native proxy gateway, and directing a request for connection to a target cloud VM via the cloud-native proxy gateway (306), and the target cloud VM may be identified by its name (e.g., resource ID). The cloud-native proxy gateway may be reachable from both the target cloud VM and the central server.

The foregoing steps 302-306 of method 300 may be conducted by an OS of central server 30. Further steps (e.g., steps 307-315) of method 300 may be conducted by an OS of cloud-native proxy gateway 40.

Method 300, at step 307, may include determining whether a reverse tunnel exists for a cloud VM having a unique resource ID (307).

If a reverse tunnel (e.g., an SSH tunnel) exists, the reverse tunnel may be outgoing from a cloud VM to a cloud-native proxy gateway (e.g., cloud-native proxy gateway 40, FIG. 1B). There may be a local port (e.g., port no. 80) on the cloud-native proxy gateway assigned to the reverse tunnel.

Method 300, at step 308, may include sending incoming communication flow from the central server to the target cloud VM through the reverse tunnel by adjusting (e.g., by mapping to, renaming, redirecting to, or reconnecting to) a port (e.g., port no. 15) designated in the incoming communication flow (from the central server) to the local port (e.g., port no. 80) assigned to the reverse tunnel. On the other end of the reverse tunnel, at the cloud-native proxy gateway 40, method 300 may include for outgoing communication flow from the target cloud VM, adjusting (e.g., by mapping to, renaming, redirecting to, or reconnecting to) the local port back to, and making connection to local host on, the originally designated port (309).

When the reverse tunnel does not exist, method 300, at step 310, may include establishing a reverse tunnel (e.g., an SSH tunnel) (outgoing connection) from the target cloud VM back to the cloud-native proxy gateway. For example, cloud-native proxy gateway 40 may keep its initial connection from central server 30 alive while establishing the reverse tunnel 42. At central server 30, it may appear as if central server 30 is establishing its own connection to a target cloud VM.

Establishing the reverse tunnel from the cloud VM back to a cloud-native proxy gateway 310, in method 300, may include, at step 311, looking up calling information for the target cloud VM in a cloud resources inventory (e.g., inventory 50, FIG. 1B and FIG. 2). The calling information may include information needed to issue an API call (to a cloud of a target cloud VM) to establish a shell connection to the target cloud VM. The calling information may, for example, include region, account, and access credentials, etc.

Establishing the reverse tunnel (outgoing connection) from the cloud VM back to the cloud-native proxy gateway 310, in method 300, may further include, at step 312, reserving a random local port for the target cloud VM by its resource name (e.g., resource ID), and, at step 313, making an API call to the cloud provider's native cloud API to establish a shell connection to the target cloud VM.

Method 300, after the shell exists, at step 314, may further include issuing a single command to a local agent (e.g., an SSM agent) in the cloud VM to establish a reverse tunnel from the target cloud VM back to the cloud-native proxy gateway. The reverse tunnel may be established under a secure shell (SSH) protocol for an outgoing connection from a cloud VM back to a cloud-native proxy gateway. The reverse tunnel may allow bi-directional traffic once it is established. A reverse tunnel may also limit the traffic that arrives via the reverse tunnel to only the local host on a specific port (the port on which the central server tries to connect). In other words, a reverse tunnel provides a network path from a cloud-native proxy gateway to an isolated cloud VM that enables host to port routing.

After establishing a reverse tunnel, at step 315, method 300 may return to step 308 to direct incoming communication flow to the cloud VM through the reverse tunnel.

In example implementations, a reverse tunnel may persist for a period of time even after a central server terminates its connection. In example scenarios, a central server and the proxy server may connect and re-connect several times in rapid succession.

Communication flow from a central server (e.g., central server 30) can now proceed to the uniquely named cloud VM (resource-id.cloudvm.com) through a cloud-native proxy gateway (e.g., cloud-native proxy gateway 40). As described in the foregoing, communication flow from a central server is intercepted at the proxy server, which looks up cloud API details, connects and forces a cloud VM to establish a reverse tunnel 42, generates a valid network path from an otherwise inaccessible cloud VM, and allows the communication flow to proceed through the reverse tunnel.

Implementations of the various techniques and systems described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatuses, e.g., programmable processors or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the processing of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal or plasma display monitors, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a networked computer system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communications network. Examples of communications networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that the described implementations have been presented by way of example only, not limitation, and various changes in form and details may be made. Any portion of the apparatuses and/or methods described herein may be combined in any combination, except mutually exclusive combinations. The implementations described herein can include various combinations and/or sub-combinations of the functions, components and/or features of the different implementations described.

What is claimed is:

1. A method for establishing connection to a virtual machine (VM) in a cloud, the method comprising:
   initiating, at a central server, a request for connection to a target cloud VM, the target cloud VM being one of a plurality of target cloud VMs and the request specifying a unique resource identifier (ID) of the target cloud VM, wherein the unique resource ID of the target cloud VM is a string of characters not in an Internet Protocol (IP) address format;
   determining whether the unique resource ID of the target cloud VM is registered in a cloud network domain in a local hosts file;
   when the unique resource ID is registered in the local hosts file, connecting to a cloud-native proxy gateway;
   directing the request for connection to the target cloud VM to the cloud-native proxy gateway, the cloud-native proxy gateway being reachable from each one of the plurality of target cloud VMs and the central server; and
   establishing a reverse tunnel from the target cloud VM back to the cloud-native proxy gateway.

2. The method of claim 1, further comprising:
   at the cloud-native proxy gateway,
   assigning a local port to the reverse tunnel.

3. The method of claim 2, further comprising:
   at the cloud-native proxy gateway,
   sending incoming communication flow from the central server to the target cloud VM through the reverse tunnel by adjusting a port designated in the incoming communication flow to the local port assigned to the reverse tunnel.

4. The method of claim 3, further comprising:
   at the cloud-native proxy gateway,
   for outgoing communication flow from the target cloud VM, adjusting the local port back to the port originally designated in the incoming communication flow and making a connection to a local host on the port originally designated in the incoming communication flow.

5. The method of claim 1, further comprising:
   keeping the connection from the central server to the cloud-native proxy gateway alive while establishing the reverse tunnel.

6. The method of claim 1, wherein establishing the reverse tunnel from the target cloud VM back to the cloud-native proxy gateway includes looking up calling information for the target cloud VM in a cloud resources inventory, the calling information including information needed to issue an Application Programming Interface (API) call to establish a shell connection to the target cloud VM.

7. The method of claim 1, wherein establishing the reverse tunnel from the target cloud VM back to the cloud-native proxy gateway includes issuing a command to an agent in the target cloud VM to establish the reverse tunnel from the target cloud VM back to the cloud-native proxy gateway.

8. The method of claim 1, further comprising:
   directing incoming communication flow to the target cloud VM through the reverse tunnel.

9. The method of claim 1, further comprising:
   when the unique resource ID of the target cloud VM is not registered in a cloud network domain in the local hosts file, forwarding the request to a local network.

10. A computer program product for establishing connection to virtual machine (VM) in a cloud, the computer program product including instructions recorded on a non-transitory computer-readable storage medium and configured to cause one or more processors to:
    initiate, at a central server, a request for connection to a target cloud VM, the target cloud VM being one of a plurality of target cloud VMs and the request specifying a unique resource identifier (ID) of the target cloud VM, wherein the unique resource ID of the target cloud VM is a string of characters not in an Internet Protocol (IP) address format;
    determine whether the unique resource ID of the target cloud VM is registered in a cloud network domain in a local hosts file;
    when the unique resource ID of the target cloud VM is registered in the local hosts file, connect to a cloud-native proxy gateway;
    direct the request for connection to the target cloud VM to the cloud-native proxy gateway, the cloud-native proxy gateway being reachable from each one of the plurality of target cloud VMs and the central server; and
    establish a reverse tunnel from the target cloud VM back to the cloud-native proxy gateway.

11. The computer program product of claim 10, wherein the instructions are configured to further cause the one or more processors to:
    at the cloud-native proxy gateway,
    assign a local port to the reverse tunnel.

12. The computer program product of claim 11, wherein the instructions are configured to further cause the one or more processors to:
    at the cloud-native proxy gateway,
    send incoming communication flow directed to the target cloud VM through the reverse tunnel by adjusting a port designated in the incoming communication flow to the local port assigned to the reverse tunnel.

13. The computer program product of claim 12, wherein the instructions are configured to further cause the one or more processors to:
    at the cloud-native proxy gateway,
    for outgoing communication flow from the target cloud VM, adjust the local port back to the port originally designated in the incoming communication flow and make a connection to a local host on the port originally designated in the incoming communication flow.

14. The computer program product of claim 10, wherein the instructions are configured to further cause the one or more processors to:
    keep the connection from the central server to the cloud-native proxy gateway alive while establishing the reverse tunnel.

15. The computer program product of claim 10, wherein establishing the reverse tunnel from the target cloud VM back to the cloud-native proxy gateway includes looking up calling information for the target cloud VM in a cloud resources inventory, the calling information including information needed to issue an Application Programming Interface (API) call to establish a shell connection to the target cloud VM.

16. The computer program product of claim 10, wherein establishing the reverse tunnel from the target cloud VM back to the cloud-native proxy gateway includes issuing a command to an agent in the target cloud VM to establish the reverse tunnel from the target cloud VM back to the cloud-native proxy gateway.

17. The computer program product of claim 10, wherein the instructions are configured to further cause the one or more processors to:
    direct incoming communication flow to the target cloud VM through the reverse tunnel.

18. The computer program product of claim 10, wherein the instructions are configured to further cause the one or more processors to:

when the unique resource ID of the target cloud VM is not registered in the cloud network domain in the local hosts file, forward the request to a local network.

19. A system for establishing connection to a virtual machine (VM) in a cloud, the system comprising:
one or more processors;
a memory;
a central server;
a cloud-native proxy gateway; and
a cloud resources inventory,
the one or more processors in conjunction with the memory configured to:
at the central server, initiate a request for connection to a target cloud VM, the target cloud VM being one of a plurality of target cloud VMs and the request specifying a unique resource identifier (ID) of the target cloud VM, wherein the unique resource ID of the target cloud VM is a string of characters not in an Internet Protocol (IP) address format;
determine whether the unique resource ID of the target cloud VM is registered in a cloud network domain in a local hosts file;
when the unique resource ID is registered in the local hosts file, connect to the cloud-native proxy gateway;
direct the request for connection to the target cloud VM to the cloud-native proxy gateway, the cloud-native proxy gateway being reachable from each one of the plurality of target cloud VMs and the central server; and
establish a reverse tunnel from the target cloud VM back to the cloud-native proxy gateway.

20. The system of claim 19, wherein the one or more processors in conjunction with the memory are further configured to:
at the cloud-native proxy gateway,
assign a local port to the reverse tunnel.

21. The system of claim 20, wherein the one or more processors in conjunction with the memory are further configured to:
at the cloud-native proxy gateway,
send incoming communication flow from the central server to the target cloud VM through the reverse tunnel by adjusting a port designated in the incoming communication flow to the local port assigned to the reverse tunnel.

22. The system of claim 21, wherein the one or more processors in conjunction with the memory are further configured to:
at the cloud-native proxy gateway,
for outgoing communication flow from the target cloud VM, adjust the local port back to the port originally designated in the incoming communication flow and make a connection to a local host on the port originally designated in the incoming communication flow.

23. The system of claim 19, wherein the one or more processors in conjunction with the memory are further configured to:

keep the connection from the central server to the cloud-native proxy gateway alive while establishing the reverse tunnel.

24. The system of claim 19, wherein establishing the reverse tunnel from the target cloud VM back to the cloud-native proxy gateway includes looking up calling information for the target cloud VM in a cloud resources inventory, the calling information including information needed to issue an Application Programming Interface (API) call to establish a shell connection to the target cloud VM.

25. The system of claim 19, wherein establishing the reverse tunnel from the target cloud VM back to the cloud-native proxy gateway includes issuing a command to an agent in the target cloud VM to establish the reverse tunnel from the target cloud VM back to the cloud-native proxy gateway.

26. The system of claim 19, wherein the one or more processors in conjunction with the memory are further configured to:
direct incoming communication flow to the target cloud VM through the reverse tunnel.

27. The system of claim 19, wherein the one or more processors in conjunction with the memory are further configured to:
when the unique resource ID of the target cloud VM is not registered in a cloud network domain in the local hosts file, forward the request to a local network.

28. A method for establishing connections to virtual machines (VMs) in a cloud environment, the method comprising:
initiating, at a central server, requests for connections to a plurality of target cloud VMs using a unique resource identifier (ID) for each of the plurality of target cloud VMs without using Internet Protocol (IP) addresses to request the connections to the plurality of target cloud VMs;
connecting to a cloud-native proxy gateway;
directing the requests for the connections to the plurality of target cloud VMs to the cloud-native proxy gateway, the cloud-native proxy gateway being reachable from the plurality of target cloud VMs and the central server; and
establishing a reverse tunnel from each of the plurality of target cloud VMs to the cloud-native proxy gateway including looking up calling information for each of the plurality of target cloud VMs in a cloud resources inventory, the calling information including information to issue an Application Programming Interface (API) call to establish a shell connection to each of the plurality of target cloud VMs.

29. The method of claim 28, further comprising:
directing communication flow to and from the plurality of target cloud VMs through the reverse tunnel for each of the plurality of target cloud VMs.

30. The method of claim 28, further comprising:
discovering and registering a plurality of new target cloud VMs using a unique resource ID for each of the plurality of new target cloud VMs.

* * * * *